United States Patent Office.

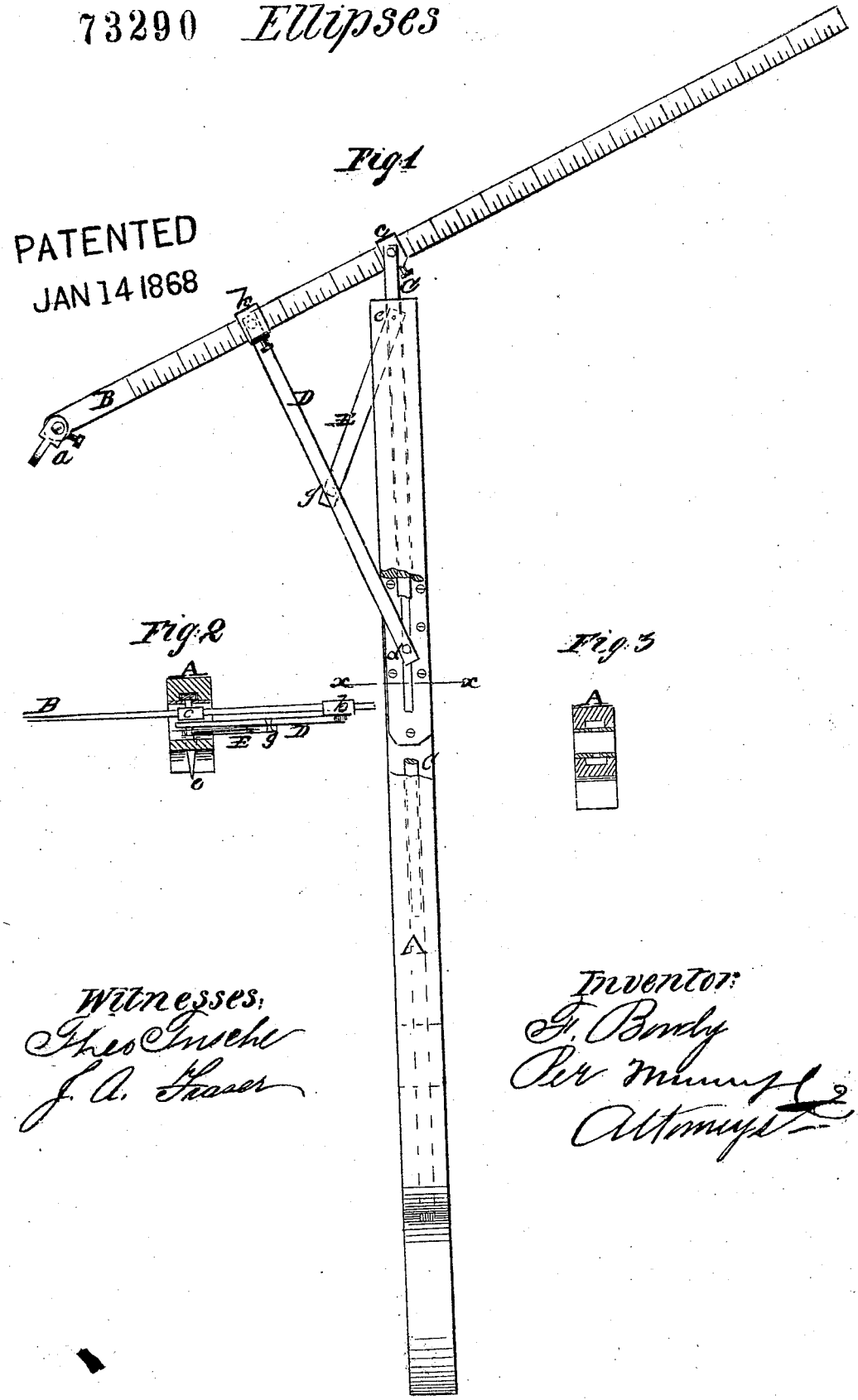

FRANKLIN BOWLY, OF WINCHESTER, VIRGINIA.

Letters Patent No. 73,290, dated January 14, 1868.

IMPROVEMENT IN INSTRUMENTS FOR DRAWING ELLIPSES.

The Schedule referred to in these Letters Patent and making part of the same.

TO ALL WHOM IT MAY CONCERN:

Be it known that I, FRANKLIN BOWLY, of Winchester, in the county of Frederick, and State of Virginia, have invented a new and improved Instrument for Drawing an Ellipse; and I do hereby declare that the following is a full, clear, and exact description thereof, which will enable others skilled in the art to make and use the same, reference being had to the accompanying drawings, forming part of this specification, in which—

Figure 1 represents a top view of the instrument applied in drawing an ellipse.

Figure 2 is a cross-section in the line $x\, x$, fig. 1, looking in one direction, and Figure 3 is the same section looking in the opposite direction.

Similar letters of reference indicate corresponding parts.

This invention relates to an improved instrument for describing ellipses of various diameters, and consists in a graduated scale for fixing the major and minor diameters of the ellipse to be described, which marking-rod is connected with two sliding rods that govern its elliptical motion around a common centre-pin, as hereinafter more minutely described.

The advantages of this instrument are, great simplicity of arrangement, expedition and convenience in its application, and accuracy with which it describes an ellipse of any desired proportions within wide limits of size, and difference between its major and minor diameters in their maximum and minimum extent.

The instrument may be used with a diamond point to cut glass for picture-frames or other purposes, as well as with a pen or pencil for drawing ellipses by draughtsmen generally.

The base or frame A of the instrument is a long, slotted handle, of wood or other material, and the marking-rod B is a metal bar, on one end of which is a swivel-pencil or diamond-holder, $a$. The marking-rod B has a graduated scale of measurement of distances on the upper side, counting from the point at $a$. Upon the marking-rod are the gauge-slides $b\, c$, provided with set-screws, to fasten them at any desired points on the scale of measurement to fix the major and minor diameters of an ellipse, as subsequently explained. The major diameter gauge slide $c$ is pivoted to the end of a rod, C, which slides in a guide-way in the upper side of the slotted handle-frame A, and moves in and out, when in operation, in a line with the frame longitudinally. The minor diameter gauge slide $b$ is pivoted to one end of a rod, D, on the other end of which is a pin, $d$, that moves in a longitudinal guide or race-way in the lower side of the slotted handle-frame A. At the end of the handle A is fastened a centre-pin, $e$, on which is secured one end of a rod, E, the other end of which rod is pivoted to the rod D at a point, $g$, equidistant from the pivot on the gauge-slide $b$ with its own length.

To describe an ellipse with this instrument, the length of the required major diameter is fixed by setting the gauge-slide $c$ at the proper point on the graduated scale of the marking-bar B, and the length of the required minor diameter of the ellipse to be described is fixed by setting the gauge-slide $b$ on the graduated scale at the proper point, the distances marked by each slide being radii of the ellipse. The centre-pin $e$ being then placed in the desired position on a plane, it will be seen that, by sweeping the pencil-holder $a$ around, it will move in an elliptical orbit around the centre-pin $e$, the larger diameter of which will be at right angles to the line of the handle-frame A, and the slide-guides therein for the rods C D, while the shorter diameter will be coincident with the same line. This result is obvious, because the rods D E being of equal length, and moving on common centres, $e\, g$, bring the marking-point $a$ equidistant from the centre-pin $e$, at the opposite ends of the major and minor diameters respectively, and intermediately between the extremities of the diameters, the line of motion of the marking-point $a$ will increase and decrease in proportion to the length of the diameters respectively, to form a perfect ellipse.

Having thus described my invention, what I claim as new, and desire to secure by Letters Patent, is—

The combination and arrangement of the slotted handle A, the marking-bar B, the sliding rods C D, and the connecting-rod E, constructed and operating substantially as and for the purpose herein described.

The above specification of my invention, signed by me, this 19th day of October, 1867.

FRANKLIN BOWLY.

Witnesses:
WM. F. MCNAMARA,
ALEX. F. ROBERTS.